US006973088B2

(12) United States Patent
Kuzhiyil et al.

(10) Patent No.: US 6,973,088 B2
(45) Date of Patent: Dec. 6, 2005

(54) PPP LINK NEGOTIATION IN MOBILE IP SYSTEMS

(75) Inventors: Anup Kuzhiyil, San Diego, CA (US); Nischal Abrol, San Diego, CA (US); Marcello Lioy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 431 days.

(21) Appl. No.: 10/375,723

(22) Filed: Feb. 25, 2003

(65) Prior Publication Data

US 2004/0062254 A1   Apr. 1, 2004

Related U.S. Application Data

(60) Provisional application No. 60/370,033, filed on Apr. 3, 2002.

(51) Int. Cl.[7] .............................................. H04L 12/56
(52) U.S. Cl. ................... 370/395.2; 455/556.1
(58) Field of Search ................. 370/338, 245, 370/328, 310, 395.2, 310.2, 341, 401, 329, 370/410, 467; 455/556, 557; 709/227, 228, 709/237, 250; 714/712, 715, 750, 776, 55

(56) References Cited

U.S. PATENT DOCUMENTS

| | | | |
|---|---|---|---|
| 6,230,012 B1 * | 5/2001 | Willkie et al. ........... 455/435.1 |
| 6,370,118 B1 * | 4/2002 | Lioy et al. ................... 370/235 |
| 6,377,556 B1 * | 4/2002 | Lioy et al. ................... 370/310 |
| 6,400,701 B2 * | 6/2002 | Lin et al. ..................... 370/336 |
| 6,483,822 B1 * | 11/2002 | Lioy et al. ................... 370/329 |
| 6,519,458 B2 * | 2/2003 | Oh et al. ..................... 455/445 |
| 6,625,164 B1 * | 9/2003 | Lioy et al. ................... 370/465 |
| 6,721,555 B1 * | 4/2004 | Phillips et al. .............. 455/411 |
| 6,775,553 B1 * | 8/2004 | Lioy ........................... 455/461 |
| 6,804,260 B2 * | 10/2004 | Lioy et al. ................... 370/477 |

FOREIGN PATENT DOCUMENTS

| | | | |
|---|---|---|---|
| EP | 0051312 | 8/2000 | .......... H04L 29/08 |
| WO | 0076173 | 12/2000 | .......... H04L 29/06 |
| WO | 0176177 | 10/2001 | .......... H04L 29/00 |

* cited by examiner

*Primary Examiner*—Wellington Chin
*Assistant Examiner*—Brenda Pham
(74) *Attorney, Agent, or Firm*—Philip R. Wadsworth; Charles D. Brown; George C. Pappas

(57) ABSTRACT

This disclosure describes techniques for establishing a PPP data session between a user terminal (UT) and an Interworking Function (IWF). The process involves establishing a PPP2 link with the IWF in response to detecting a mobile IP data session request from the UT, detecting a PPP1 link with the UT in response to the PPP2 link being established, detecting that a PPP2 link failure has occurred, and reconfiguring at least one of the WCD and the UT to an initial state.

18 Claims, 5 Drawing Sheets

PPP LINK NEGOTIATION IN MOBILE IP SYSTEMS

RELATED APPLICATIONS

This application claims the benefit of provisional U.S. Application Ser. No. 60/370,033 filed on Apr. 3, 2002, assigned to the assignee of the present application, and incorporated herein by reference in its entirety for all purposes.

This application is related to co-pending patent application filed on Jan. 21, 2003, entitled "SYSTEM AND METHOD FOR TRANSPARENT MOBILE IP REGISTRATION," Ser. No. 10/348,937, assigned to the same Assignee as the present application.

TECHNICAL FIELD

This disclosure relates to wireless data services, more particularly to PPP link negotiations in mobile IP systems.

BACKGROUND

Internetworking, i.e., the connection of individual local area networks (LANs), has rapidly become very popular. The infrastructure and associated protocols commonly referred to as the "Internet" have become well known and widely used. At the heart of the Internet is the Internet Protocol (IP) which supports the routing of datagrams between the LANs as is well known in the art, and further described in Request For Comment (RFC) 791 entitled, "INTERNET PROTOCOL DARPA INTERNET PROGRAM PROTOCOL SPECIFICATION," dated September 1981.

IP is a datagram-oriented protocol that provides several services, including addressing. The IP protocol encapsulates data into an IP packet for transmission, and affixes addressing information to the header of the packet. IP headers contain 32-bit addresses that identify the sending and receiving hosts. These addresses are used by intermediate routers to select a path for the packet through the network towards its ultimate destination at the intended address. A basic concept of IP addressing is that initial prefixes of the IP address can be used for generalized routing decisions. For example, the first 16 bits of an address might identify Company A, the first 20 bits identify Company A's main office, the first 26 bits identify a particular Ethernet in that office, and the entire 32 bits identify a particular host on that Ethernet. As a further example, every address in Company A's IP network might be of the form (in "dotted-quad notation"): 129.46.xxx.xxx, where "xxx" refers to any allowable integer between zero and 255.

As is evident by this prefix-based routing characteristic of IP, the IP addresses contain implied geographical information about the location of a particular host on the Internet. In other words, whenever any router on the Internet receives a packet having a destination IP address that begins "129.46" the router forwards that packet in a particular direction towards Company A's network in San Diego, Calif., USA. Thus, the IP protocol allows datagrams originating at any Internet node in the world to be routed to any other Internet node in the world, given that the originating party knows the IP address of the destination party.

As mobile computing and mobile Internet access have grown in popularity, a need has arisen to provide mobile data support for mobile terminals such as laptop or palmtop computers using the IP protocol. However, as just mentioned, the IP addressing scheme used for Internet routing contains implied geographic information. In other words, if a user desires to use a fixed IP address to identify his mobile terminal, the IP packets intended for that mobile terminal will not be routed to that mobile terminal when it is away from its "home" network (i.e., the network which encompasses its fixed IP address) in the absence of some technique for "forwarding" IP packets to the mobile terminal.

For example, suppose a user decides to remove his mobile user terminal from its "home" IP network at Company A in San Diego, and take it with him on a trip to Palo Alto, Calif., and there connect to Stanford University's IP network while still keeping his Company assigned fixed IP address. Any IP datagram intended for the mobile user terminal will still be routed to Company A's IP network because of the geographical location information implicit in the mobile user terminal's fixed IP address. Such IP packets will not be delivered to the mobile user terminal while away from its "home" network unless some mechanism is in place to forward IP packets from Company A's IP network to the mobile user terminal at its current point of attachment to the Internet at Stanford University's IP network in Palo Alto.

In order to meet this need, RFC 2002, entitled "IP Mobility Support," Network Working Group, Ed., C. Perkins, IBM, dated October 1996 (available on the world wide web at http://www.rfc.net/rfc2002.html), specifies protocol enhancements that allow transparent routing of IP datagrams to mobile nodes in the Internet. Using the techniques described in RFC 2002, each mobile node may always be identified by its "home" IP address, regardless of its current point of attachment to the Internet. While situated away from its home IP network, a mobile user terminal may become associated with a "care-of" address, thereby providing forwarding information necessary to route IP datagrams to its current point of attachment to the Internet. RFC 2002 accomplishes this by providing for registration of the care of address with a "home agent." This home agent forwards IP datagrams intended for the mobile terminal by using a technique called "IP tunneling." IP tunneling involves the home agent attaching a new IP header which contains the care-of address to any arriving IP packet which has a destination address corresponding to the mobile user terminal's home IP address. After arriving at the care-of address, a "foreign agent" at the care-of address strips off the IP tunneling header, and delivers the IP packet to the mobile user terminal at its current point of attachment to the Internet.

In this way, the techniques of RFC 2002 provide mobile data services for users who desire to relocate their mobile terminal's point of attachment to the Internet without having to change the mobile terminal's IP address. This ability has several advantages. First, it allows originating nodes elsewhere on the Internet to send periodic "push" services to the mobile user terminal regardless of where it is. Such services might include stock quotes or e-mail. This obviates the need for the mobile user to "dial in" or otherwise contact his home network in order to retrieve information. Furthermore, it allows the mobile terminal to relocate as often as desired, without any originating parties having to keep track of where the mobile terminal is currently located.

To increase the freedom of mobility of the mobile user terminal, many mobile users will typically use wireless communication devices (sometimes referrred to as "WCDs", such as cellular or portable phones, or analogous wireless communication devices, commonly referred to as "mobile stations," as the point of access to the land-based Internet network. As used herein, "mobile station" will refer to any subscriber station in the public wireless radio network that is intended to be used while in motion or during halts at unspecified points. Mobile stations include portable units (e.g., hand-held personal phones, wireless modems, etc.) and units installed in vehicles, as well as wireless local loop (WLL) telephones.

Many protocols exist which allow data communication between a mobile user terminal and an Interworking Function (IWF), or internal interface. For example, Telecommunications Industry Association (TIA)/Electronics Industries Association (EIA) Interim Standard IS-707.5, entitled "Data Service Options for Wideband Spread Spectrum Systems: Packet Data Services," published February 1998, defines requirements for support of packet data transmission capability on TIA/EIA IS-95 wideband spread spectrum systems. IS-707.5 specifies a packet data bearer service that may be used for communication between a mobile terminal and an IWF via a Base Station/Mobile Switching Center (BS/MSC). It provides procedures that can apply to multiple packet data services, including the Mobile IP service of RFC 2002, as well as Cellular Digital Packet Data (CDPD) which is described in CDPD-1995, entitled "Cellular Digital Packet Data System Specification, Version 1.1," published Jan. 29, 1995 by the CDPD Forum, Inc.

CDPD is an Analog Mobile Phone System (AMPS) cellular data service, which includes some of its own support for mobility. CDPD differs from Mobile IP in several significant ways. Most notably, a CDPD modem has an assigned IP address that belongs to the CDPD network. So although a CDPD modem may roam within the CDPD network, it may not use its IP address outside of the CDPD network in the same way that a Mobile IP supported terminal may use its "home" IP address outside of its "home" network.

IS-707.5 also provides the requirements for communication protocols on the links between a mobile user terminal and a wireless communications device (the $R_m$ interface), between the wireless communications device and the BS/MSC (the $U_m$ interface), and between the BS/MSC and the IWF.

Wireless communications networks offer much flexibility to the user, in that they allow users of portable communications devices, such as personal digital assistants, laptop computers, telephones, and other appliances to connect to the Internet from any location within the region served by the wireless network. For example, in a personal communication system by which a mobile user terminal uses an RF link to communicate with an intelligent base station, the intelligent base station provides the mobile terminal with access to a Packet Data Switched Network (PDSN), through which a connection to the IWF is made.

The PDSN provides access to the Internet, intranets and Wireless Application Protocol (WAP) servers. The PDSN acts as an access gateway for simple Internet Protocol and Mobile Internet Protocol users. It provides foreign agent support and packet transport for virtual private networking. It also acts as an Authentication, Authorization, and Accounting (AAA) client.

Mobile IP

IPv4 (Internet Protocol version 4) assumes that a node's Internet Protocol (IP) address uniquely identifies the node's point of attachment to the Internet. Therefore, a node must be located on the network indicated by its IP address in order to receive datagrams destined to it; otherwise, datagrams destined to the node would be undeliverable.

For a node to change its point of attachment without losing its ability to communicate, currently one of the two following mechanisms must typically be employed: a) the node must change its IP address whenever it changes its point of attachment, or b) host-specific routes must be propagated throughout much of the Internet routing fabric. Both of these alternatives are often unacceptable. The first makes it impossible for a node to maintain transport and higher-layer connections when the node changes location. The second has obvious and severe scaling problems, especially relevant considering the explosive growth in sales of mobile computers equipped with wireless communication devices.

Mobile IP is a protocol that allows laptop computers or other mobile computer units (referred to as "Mobile Nodes" herein) to roam between various sub-networks at various locations—while maintaining Internet and/or WAN connectivity. Without Mobile IP or related protocol, a Mobile Node would be unable to stay connected while roaming through various sub-networks. This is because the IP address required for any node to communicate over the Internet is location specific. Each IP address has a field that specifies the particular sub-network on which the node resides. If a user desires to take a computer that is normally attached to one node and roam with it so that it passes through different sub-networks, it cannot use its home base IP address. As a result, a business person traveling across the country cannot merely roam with his or her computer across geographically disparate network segments or wireless nodes while remaining connected over the Internet. This is not an acceptable state-of-affairs in the age of portable computational devices.

To address this problem, the Mobile IP protocol has been developed and will soon be implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Mobile IP provides a method to allow IP traffic to find nodes whose point of attachment to the Internet changes. An IP address implies a geographical/topological location for a particular node; for example, all of the IP packets with a destination address of 129.46.x.x will be forwarded to San Diego. If a mobile user wanted to use one of these addresses and connect to the Internet via some other Internet service provider, that address would be topologically incorrect, and the packets would never find the mobile in question, as they would be sent to the corporate network, and not to the network belonging to the Internet Service Provider (ISP) where the mobile has attached itself. Mobile IP provides a mechanism for forwarding these packets to the mobile node, regardless of its location.

The most significant differences between simple IP and Mobile IP is that simple IP calls require only that Point-to-Point Protocol (PPP) be negotiated, while Mobile IP calls require that PPP be established and the mobile node registration occur. Simple IP calls have IP address assignment made during PPP negotiation, while Mobile IP calls have an IP address assignment made during Mobile IP Registration.

The PPP protocol is described in detail in the publication entitled "The Point-to-Point Protocol (PPP)," Simpson, W., Editor, STD 51, RFC 1661, July, 1994.

To maintain connectivity, as a mobile user moves within and without cellular boundaries, in either satellite or terrestrial cellular networks, the wireless link must be disconnected from the old transceiver and relinked to the new transceiver. To initiate a new link, the mobile user and the cell transceiver pass link control messages, negotiating link options for the subsequent data between the mobile user and the cell transceiver to negotiate the options to be used on the new link. Several link control signals exchange data and negotiate the parameters to be used to pass data. After the negotiations are completed, the mobile user can communicate using the wireless signal. Unfortunately, the relinking process can fail, resulting in no connection to the mobile user. When that happens, the mobile user terminal may lock up. This will prevent new calls from being established until the user terminal is rebooted.

There is a need for performing Mobile IP registration of a mobile user terminal more efficiently, with the wireless communications device acting as a proxy for the user terminal, in order to establish Mobile IP support for the user terminal and to avoid problems associated with conventional techniques.

SUMMARY

This disclosure describes techniques for establishing a PPP data session between a user terminal (UT) and an Interworking Function (IWF). The process involves establishing a PPP2 link with the IWF in response to detecting a mobile IP data session request from the UT, detecting a PP1 link with the UT in response to the PP2 link being established, detecting that a PPP2 link failure has occurred, and reconfiguring at least one of the WCD and the UT to an initial state.

DETAILED DESCRIPTION

Figure 1:
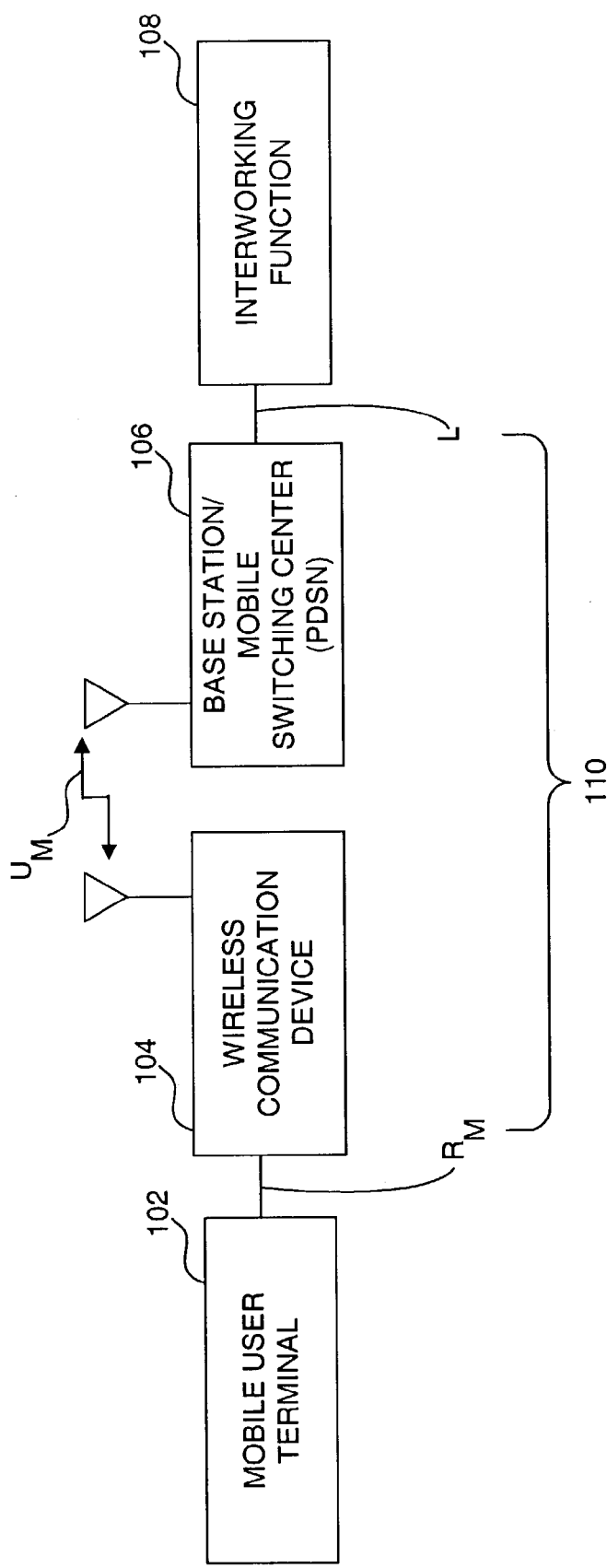
FIG. 1 illustrates an exemplary wireless communication system.

The Mobile IP process and environment includes the Internet over which a Mobile Node (e.g., a laptop computer) can communicate remotely via mediation by a Home Agent and a Foreign Agent. Typically, the Home Agent and Foreign Agent are routers or other network connection devices performing appropriate Mobile IP functions as implemented by software, hardware, and/or firmware. A Home Agent is the router or other Internet connection device located at the place where the user terminal normally resides. A Foreign Agent is any other router or other Internet connection device. A particular Mobile Node plugged into its home network segment connects with the Internet through its designated Home Agent. When such a Mobile Node roams, it communicates via the Internet through an available Foreign Agent. Presumably, there are many Foreign Agents available at geographically disparate locations to allow widespread Internet connection via the Mobile IP protocol.

A Mobile Node normally resides on (or is "based at") a network segment that allows its network entities to communicate over the Internet through the Home Agent. The Home Agent need not directly connect to the Internet.

The Mobile Node may be removed from its home base network segment and roam to a remote network segment. The remote network segment will typically communicate with the Internet through a router acting as a Foreign Agent. The Mobile Node may identify the Foreign Agent through various solicitations and advertisements that form part of the Mobile IP protocol. When the Mobile Node engages with the remote network segment, the Foreign Agent relays a registration request to the Home Agent. The Home and Foreign Agents may then negotiate the conditions of the Mobile Node's attachment to the Foreign Agent. For example, the attachment may be limited to a period of time, such as two hours. When the negotiation is successfully completed, the Home Agent updates an internal "mobility binding table" which specifies the Foreign Agent's IP address in association with the identity of the Mobile Node. Further, the Foreign Agent updates an internal "visitor table" which specifies the Mobile Node address, Home Agent address, etc. In effect, the Mobile Node's home base IP address has been shifted to the Foreign Agent's IP address.

Now, suppose that the Mobile Node wishes to send a message to a corresponding node from its new location. An output message from the Mobile Node is then packetized and forwarded through the Foreign Agent over the Internet to the corresponding node according to a standard Internet protocol. If the corresponding node wishes to send a message to the Mobile Node—whether in reply to a message from the Mobile Node or for any other reason—it addresses that message to the IP address of the Mobile Node at its Home Agent. The packets of that message are then forwarded over the Internet ultimately to the Home Agent. From its mobility binding table, the Home Agent recognizes that the Mobile Node is no longer attached to the home network segment. It then encapsulates the packets from the corresponding node (which are addressed to the Mobile Node on the home network segment) according to a Mobile IP protocol and forwards these encapsulated packets to a "care of" (C.O.) address for the Mobile Node. The C.O. address is the IP address of the Foreign Agent. The Foreign Agent then strips the encapsulation and forwards the message to the Mobile Node at the Foreign Agent.

Establishing a Point to Point Protocol (PPP) Link

FIG. 1 illustrates a high-level block diagram of a wireless data communication system. A mobile user terminal 102 communicates with an Interworking Function (IWF) 108 (e.g., the Internet) via a wireless communication system 110. Communication system 110 includes a wireless communication device (WCD) 104 and a Base Station/Mobile Switching Center (BS/MSC) 106. BS/MSC 106 may be a conventional wireless base station or gateway as is known in the art. BS/MSC 106 is connected to IWF 108 in a known manner, typically via a Packet Data Switched Network (PDSN). The PDSN is a device connected to the base station and acts as an access node to the Internet. For purposes of this discussion, the base station and PDSN can be considered to be a single unit and will be referred to by reference number 106.

User terminal 102 is coupled to wireless communication device 104, typically via a wired serial connection. Communication device 104 is in wireless communication with PDSN 106 and IWF 108.

Figure 2:
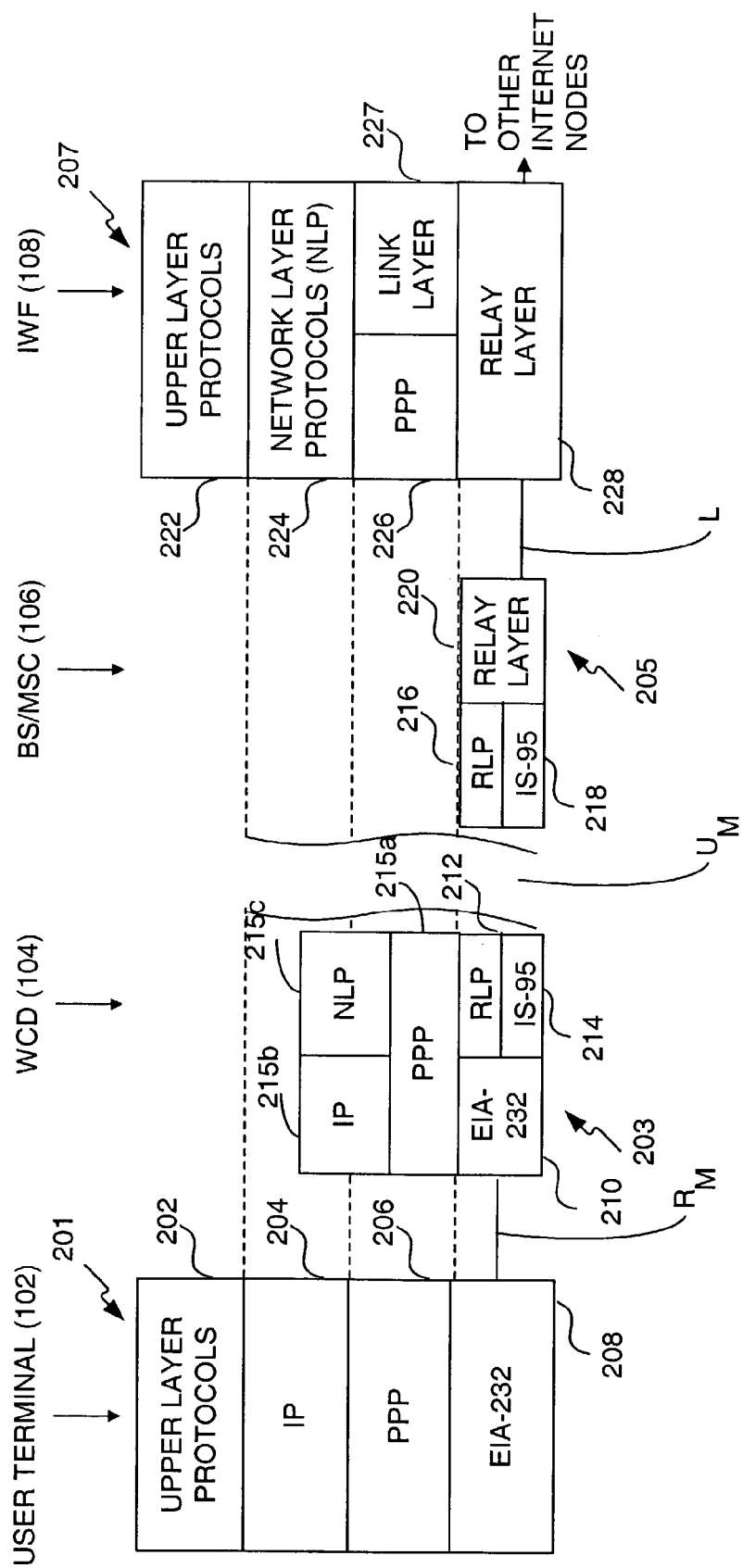
FIG. 2 shows the protocol stacks of a wireless communication system.

FIG. 2 is a diagram of the protocol stacks in each entity of an IS-707.5 Network Model. FIG. 2 corresponds roughly to FIG. 1.4.2.2-1 of IS-707.5. At the far left of the figure is a protocol stack 201, shown in conventional vertical format, of the protocol layers running on user terminal 102 (e.g., the mobile terminal, laptop or palmtop computer). User terminal protocol stack 201, comprising multiple protocol layers 202, 204, 206 and 208, is illustrated as being logically connected to a wireless communication device protocol stack 203, comprising protocol layers 210, 212, and 214, 215a, 215b, and 215c, over a wired $R_m$ interface. Wireless communication device 104 is illustrated as being logically connected to a PDSN protocol stack 205 (corresponding to BS/MSC (PDSN) 106), comprising protocol layers 216, 218 and 220, over a $U_m$ air interface. The PDSN protocol stack 205 is, in turn, illustrated as being logically connected to an IWF 108 protocol stack 207, comprising multiple protocol layers 222, 224, 226, 227 and 228, over a known (e.g., wired) interface L.

An example of the operation of FIG. 2 is as follows. An upper layer protocol 202 entity, such as an application program running on user terminal 102, has a need to send IP packets over the Internet. An example application may be a web browser such as Netscape Navigator, or Microsoft Internet Explorer, or the like. The web browser requests a Universal Resource Locator (URL), such as "http://www-.companya.com." A Domain Name System (DNS) protocol, also an upper layer protocol 202, translates the textual host name "www.companya.com" into a 32-bit numeric IP address. The Hypertext Transfer Protocol (HTTP), also an upper layer protocol 202, constructs a GET message for the requested URL, and also specifies that Transmission Control Protocol (TCP) will be used to send the message and that TCP port 80 is used for HTTP operations.

The TCP protocol, also an upper layer protocol 202, opens a connection to the IP address specified by DNS port 80, and transmits the HTTP GET message. The TCP protocol specifies that the IP protocol will be used for message transport. The IP protocol 204 transmits the TCP packets to the IP address specified. The Point to Point Protocol (PPP), a link layer protocol 206, encodes the IP/TCP/HTTP packets and transmits them across the $R_m$ interface using relay layer EIA-232 protocol 208 to the EIA-232 -compatible port on wireless communication device 104. PPP contains two protocols: the link control protocol (LCP) and Internet protocol control protocol (IPCP). These two protocols have to be negotiated independently. The LCP protocol is negotiated first. Once that is set up, then the IPCP protocol is negotiated. Once IPCP negotiation has been completed, Mobile IP Registration is conducted, at which time an IP address is assigned to user terminal 102 by PDSN 106.

An EIA-232 protocol 210 on wireless communication device 104 passes the transmitted PPP packet to a combination of a Radio Link Protocol (RLP) 212 and an IS-95 protocol 214 for transmission to PDSN 106 over the $U_m$ air interface. RLP protocol 212 is defined in IS-707.2, and the IS-95 protocol 214 is defined in IS-95 mentioned above. A complementary relay layer protocol stack on PDSN 106, including a combination of RLP protocol 216 and IS-95 protocol 218 receives the PPP packets over the $U_m$ air interface, and passes them to a wireless communication relay layer protocol 220 over the wired PDSN-IWF interface L to an IWF relay layer protocol 228. Wireless communication relay layer protocol 220 and IWF relay layer protocol 228 are described in TIA/EIA IS-658 entitled, "Data Services Interworking Function Interface Standard for Wideband Spread Spectrum Digital Cellular System."

A PPP protocol 226 in the link layer of IWF 108 decodes the PPP packets from user terminal 102, and serves to terminate the PPP connection between user terminal 102 and IWF 108. The decoded packets are passed from PPP protocol 226 to the IP protocol in network layer protocols 224 of IWF 108 for examination, and further routing to the IP address specified by user terminal 102 in the IP packet header (here, the IP address for www.companya.com). If there are any upper layer protocol tasks to be performed at IWF 108, such as TCP, they are performed by upper layer protocols 222.

Assuming that the ultimate destination of the IP packets generated by user terminal 102 is not IWF 108, the packets are forwarded through network layer protocols 224, PPP protocols 226 and relay layer protocols 228 of IWF 108 to the next router (not shown) on the Internet. In this manner, IP packets from user terminal 102 are communicated through wireless communication device 104, PDSN 106, and IWF 108 towards their ultimate intended destination on the Internet, thereby providing wireless packet data services for user terminal 102 according to the IS-707.5 standard relay model.

As illustrated in FIG. 2, the IS-707.5 standard provides the requirements for communication protocols on the links between a user terminal 102 and an IWF 108, including the requirements for the $R_m$, the $U_m$, and the L interfaces. These requirements and procedures are applicable to supporting the Mobile IP services described in RFC 2002. However, IS-707.5 does not provide procedures for establishing Mobile IP services in the first instance. In other words, IS-707.5 provides a framework for supporting Mobile IP services, but does not provide procedures for negotiating Mobile IP services, or registering the user terminal 102 with a home agent and a foreign agent for Mobile IP services.

In order to establish communications over a point-to-point link, each end of the PPP link must first send link layer control protocol (LCP) packets to configure and test the data link. After the link has been established, the peer may be authenticated. Then, PPP must send network layer control protocol (NCP) packets to choose and configure one or more network-layer protocols. Once each of the chosen network-layer protocols has been configured, datagrams from each network-layer protocol can be sent over the link. The link will remain configured for communications until explicit LCP or NCP packets close the link down, or until some external event occurs (an inactivity timer expires or network administrator intervention).

Establishing the Mobile IP Connection

User terminal 102 may move from one PDSN to another PDSN. This can happen, for example, if user terminal 102 is a laptop computer that is being operated on a train or airplane in motion. It is highly desirable to maintain the same IP address for the user terminal and to ensure that the handoffs or transfers between different PDSNs be transparent to the user and allow the user to continue to run programs over the Internet without interruption.

Figure 3:
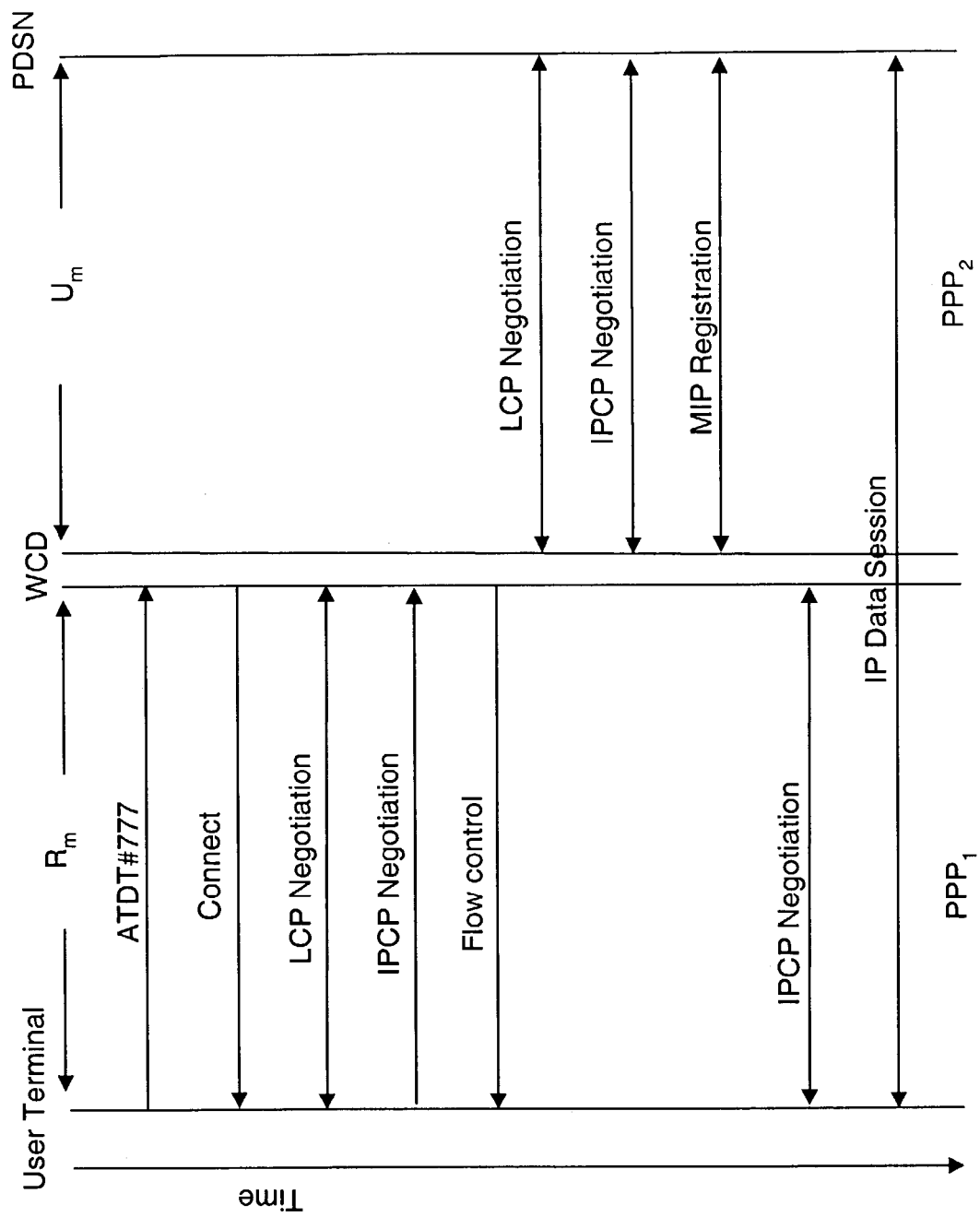
FIG. 3 shows the flow over the $R_m$ and $U_m$ interfaces necessary to establish an IP data session in a conventional system.

FIG. 3 shows the communication links between user terminal 102, such as a laptop computer, and wireless communication device 104, such as a web enabled cellular telephone, and between wireless communication device 104 and PDSN 106 in a conventional system. The interface between user terminal 102 and wireless communication device 104 typically comprises a wired connection via an RS232 serial connection, and is known as the $R_m$ interface. The connection between wireless communication device 104 and PDSN 106 is a wireless air interface, and is known as the $U_m$ interface.

Conventionally, when the user terminal received a connect signal, this would immediately trigger a PPP negotiation session on the $R_m$ interface. Once the PPP had been negotiated on the $R_m$ link, then a PPP negotiation session would take place over the $U_m$ interface.

In known systems, an Internet data session begins when user terminal 102 issues a command to wireless communication device 104 to initiate a data session. This command may typically comprise an "ATDT#777" or equivalent command signal. This command alerts wireless communication device 104 to commence a sequence of instructions to establish a connection between user terminal 102 and PDSN 106. During call setup, a PPP session or link goes through a negotiating phase to establish the proper communication protocols at each end of a link (i.e., the $R_m$ link and the $U_m$ link). The link between user terminal 102 and wireless communication device 104 is called the $PPP_1$ link. The link between wireless communication device 104 and PDSN 106 is called the $PPP_2$ link.

Referring to FIG. 3, where the Y-axis represents time, upon receipt of the initiation command (e.g., "ATDT#777") from user terminal 102, wireless communication device 104 sends a "connect" signal back to terminal 102. Thereafter, terminal 102 and device 104 conduct LCP and IPCP negotiations to establish a communication link between the two devices on the $PPP_1$ link. Upon completion of the LCP and IPCP negotiations, device 104 returns a "flow control" command to terminal 102. The "flow control" command prevents terminal 102 from sending data to device 104 as long as the flow control is in effect.

Once the communication link between terminal 102 and device 104 is established, device 104 communicates with PDSN 106 over the $U_m$ air interface to establish a $PPP_2$ link. Device 104 and PDSN 106 conduct LCP and IPCP negotiations over the $U_m$ air interface. Upon completion of the LCP and IPCP negotiations, a Mobile IP (MIP) registration is communicated over the $U_m$ link. During the MIP registration process, an IP address is assigned to terminal 102.

Following IPCP negotiation over the $U_m$ link, a further IPCP negotiation may be required to be conducted over the $PPP_1$ link. This further negotiation may be needed in the event that the $PPP_2$ protocols established between wireless communication device 104 and PDSN 106 are different than $PPP_1$ protocols established between user terminal 102 and wireless communication device 104.

Once all of the negotiations are completed over the $R_m$ and $U_m$ links, the flow control is removed and data can be transferred between user terminal 102 and PDSN 106.

One of the problems with this approach has been that there are great difficulties in terminating the call connection at the user terminal if the PDSN and/or base station either refuse to accept the initial call from the wireless communication device or the call is dropped for some reason, due for example, to a poor radio link. One result is that subsequent calls from that mobile device can not be made without first rebooting user terminal 102 because system resources cannot be cleared properly. This condition holds true for both voice and data calls.

Figure 4:
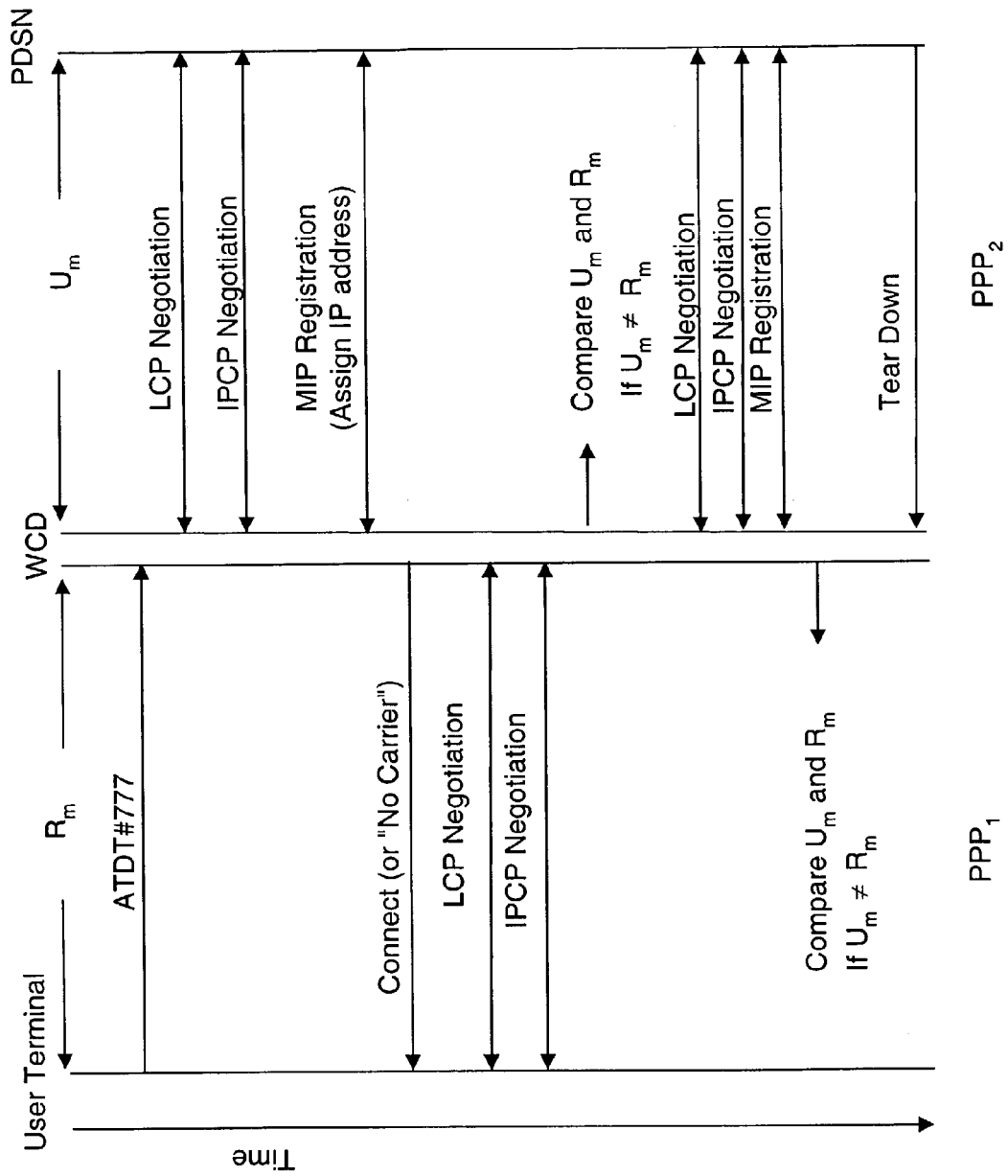
FIG. 4 shows the flow over the $R_m$ and $U_m$ interfaces necessary to establish an IP data session in accordance with one embodiment of the invention.

FIG. 4 shows the flow over the $R_m$ and $U_m$ interfaces necessary to establish an IP data session in accordance with an embodiment of the invention. When user terminal 102 desires to initiate an IP data session, it sends a session initiation command (e.g., "ATDT#777" or equivalent) to wireless communication device 104. Upon receipt of the session initiation command, device 104 communicates with PDSN 106 to establish a PPP link over the $U_m$ interface. Unlike conventional systems, the present solution does not establish a PPP link over the $R_m$ link first. Instead, a PPP link is first established over the $U_m$ link. Device 104 and PDSN 106 conduct LCP and IPCP negotiations to establish the desired PPP protocols for the $U_m$ interface. Once the LCP and IPCP negotiations over the $U_m$ interface have been completed, MIP registration (including an IP address) is made available to be sent to user terminal 102.

Upon receipt of the MIP registration information by wireless communication device 104, a connect command is sent by device 104 to user terminal 102 over the $R_m$ interface. Terminal 102 and device 104 then conduct LCP and IPCP negotiations to establish a $PPP_1$ protocol link over the $R_m$ interface. The MIP IP address for user terminal 102 established by PDSN 106 is sent to terminal 102 as part of the IPCP negotiation session. Once the $PPP_1$ protocol link has been established, the $PPP_1$ protocol options are compared to the $PPP_2$ protocol options established over the $U_m$ interface. If the $PPP_1$ and $PPP_2$ protocol options match each other, an IP data session is established between user terminal 102 and PDSN 106.

If the $PPP_1$ and $PPP_2$ options do not match each other, a further LCP and IPCP negotiation session is conducted over the $U_m$ interface. The new $PPP_2$ options are then compared to the $PPP_1$ protocol options. If the $PPP_1$ and new $PPP_2$ protocol options match each other, an IP data session is established between user terminal 102 and PDSN 106. If the respective protocol options still do not match, a "tear down" signal is sent by PDSN 106 to terminate the connection between user terminal 102 and PDSN 106.

In the illustrative embodiment, when user terminal 102 initiates a dial-up networking session, no connect signal is sent back to user terminal 102 until the $U_m$ negotiation session has been completed and an address has been assigned for user terminal 102. Once the address is assigned, that information is then sent to wireless communication device 104 and a connect signal is sent from device 104 to user terminal 102 to begin the process of setting up the $PPP_1$ protocols. User terminal 102 can then maintain an IP session and transmit and receive data over the wireless link to and from PDSN 106.

If, during the IP session, the link over the $U_m$ interface is broken, a "no carrier" signal is returned to wireless communication device 104 but no user terminal settings are affected. Terminal 102 may continue to transmit data to wireless communication device 104. Device 104 will store the transmitted data in a data buffer until a connection over air interface $U_m$ is re-established. In this way, wireless communication device 104 and air interface $U_m$ are effectively transparent to user terminal 102.

One advantage of the illustrative embodiment is realized during handoffs between networks. There are, typically, a plurality of PDSNs which service different geographic regions. For example, there may be three or four PDSNs in the continental United States alone. User terminal 102 and its associated wireless communication device 104 may be located in a moving vehicle such as a car, train, or airplane. User terminal 102 may therefore move between PDSNs, for example from PDSN1 to PDSN2. There must be a smooth handoff from PDSN 1 to PDSN 2 to minimize the likelihood of a connection being dropped. In such a situation, it is necessary to hand off the $PPP_2$ link from PDSN 1 to PDSN 2. A new $PPP_2$ link must be established on PDSN 2. This also requires a new mobile IP registration on PDSN 2. If the options negotiated on PDSN 1 do not change for PDSN 2, there is no need to resynch the $PPP_2$ link over the $R_m$ interface. Thus, the fact that there has been a handoff from PDSN 1 to PDSN 2 is totally transparent to user terminal 102.

Figure 5:
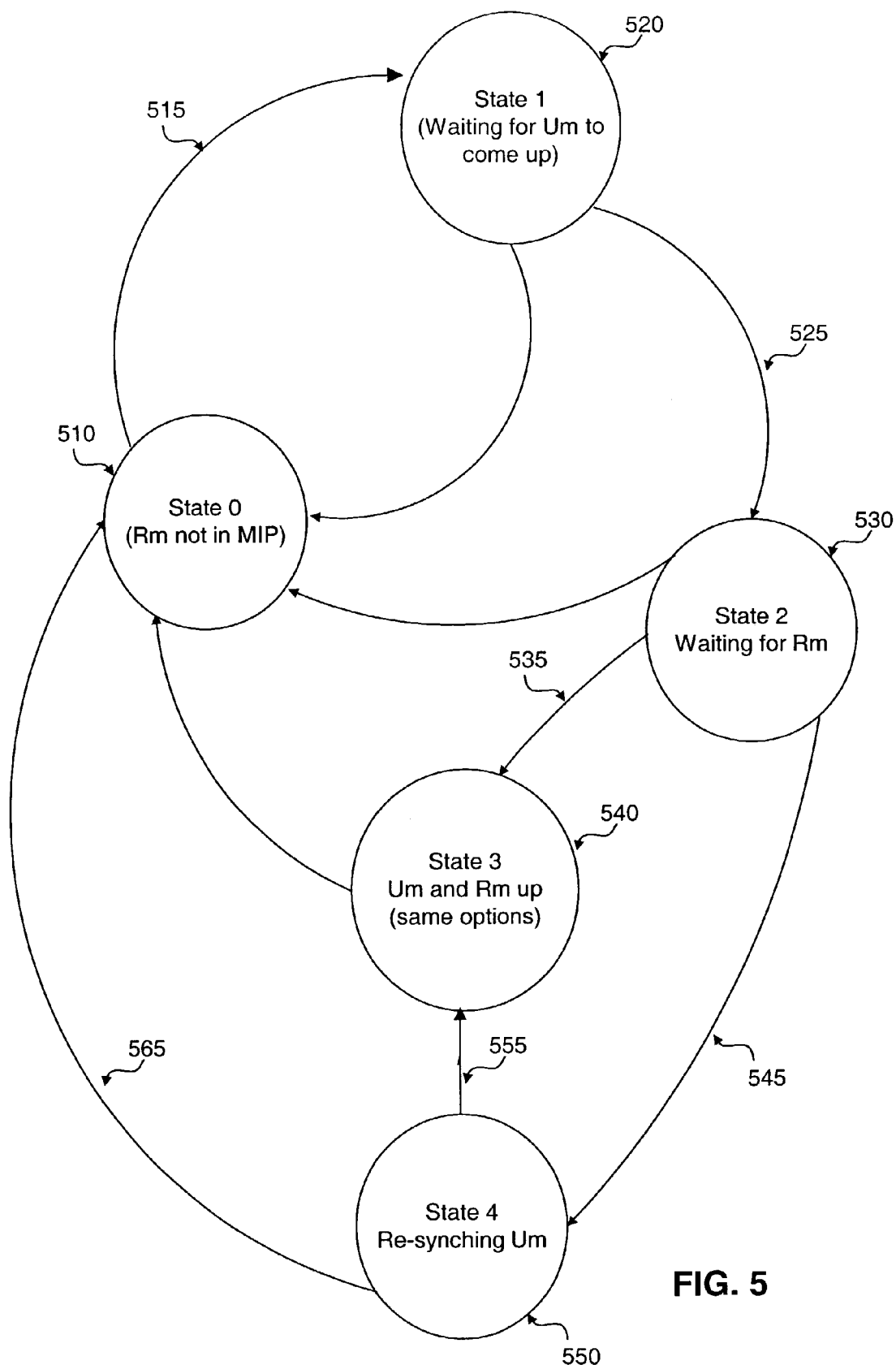
FIG. 5 is a state machine illustrating information about the state of each of the $R_m$ and $U_m$ PPP links.

FIG. 5 is a state machine that contains information about the state of each of the $R_m$ and $U_m$ PPP links. If a failure situation is encountered, the state machine contains all of the information about the links, allowing the state machine to handle the different failure conditions without having an adverse impact on the operation of user terminal 102. In the past, failure conditions would produce error signals that adversely affected the operation of user terminal 102, often requiring it to be rebooted to clear the error. In an exemplary embodiment, the state machine remembers the states of each of the $U_m$ and $R_m$ links and applies the stored values as needed to maintain or reestablish the links.

The state diagram of FIG. 5 represents a software program that runs on wireless communications device 104. The software controls the negotiation process. Circle 510 represents the start up or initial state when the system is waiting for user terminal 102 to send an initiation (e.g., ATDT#777) signal. When the wireless communication device 104 receives the initiation signal from user terminal 102, the system transitions over path 515 from state zero to state 1 represented by circle 520. In state 1, the system begins the LCP and IPCP negotiations over the $U_m$ interface and performs the mobile IP registration process. Once the $U_m$ PPP$_2$ link is established and mobile IP registration is completed, this status information is passed over path 525 to state 2 represented by circle 530. At this point, negotiations on the $U_m$ link have been completed. The next step is to negotiate the PPP$_1$ link over the $R_m$ interface. A connect signal is sent back to user terminal 102 by wireless communication device 104 and the system starts negotiating the PPP$_1$ link on the $R_m$ interface. If the options on both the $R_m$ and $U_m$ links are the same, set up is complete and the system moves over path 535 to state 3 represented by circle 540. If the options on each of the links are different, the system moves over path 545 to state 4 represented by circle 550. In this state, the PPP$_2$ link over the $U_m$ interface must be renegotiated and modified to have the same options as the PPP$_1$ link. As a practical matter, the same options are negotiated on both the $R_m$ and $U_m$ links a high percentage of the time, typically over 90% of the time. If it is necessary to renegotiate the $U_m$ link, it is based on the options established on the PPP$_1$ link. If the PPP$_2$ link is ultimately negotiated with the same options as are on the PPP$_1$ link, the system shifts over path 555 to state 3 (circle 540). If the PPP$_2$ link cannot be established with the same options as the PPP$_1$ link, the system returns over path 565 to state zero (circle 510) and the connection is dropped.

Each of the links represents an error state condition at various stages of the set up process. If an error occurs at any point along the process in which the call is dropped, the system knows to return to state zero (circle 510) along the corresponding error path. Once the system returns to state zero, wireless connection device 104 is ready and available to receive a new call.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention.

For example, in addition to configurations using hardware, implementation of the invention may be embodied in software, disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C or C++), hardware description languages (HDL) including Verilog HDL, VHDL, and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., A microprocessor core) that is embodied in program code and may be transformed to hardware as part of the production of integrated circuits. In addition, the system and techniques may be embodied as a combination of hardware and software. Thus, the present invention should not be limited by any of the above-described exemplary embodiments, but should be defined only in accordance with the following claims and their equivalents.

What is claimed is:

1. A wireless communication device (WCD) for establishing a PPP data session between a user terminal (UT) and an Interworking Function (IWF), comprising:
    means for establishing a PPP2 link with the IWF in response to detecting a mobile IP data session request from the UT;
    means for detecting a PPP1 link with the UT in response to the PPP2 link being established;
    means for detecting that a PPP2 link failure has occurred; and
    means for reconfiguring at least one of the WCD and the UT to an initial state.

2. The WCD of claim 1, wherein the failure occurs after the PPP2 link is established.

3. The WCD of claim 1, wherein the failure occurs before the PPP1 is established.

4. The WCD of claim 1, wherein the failure occurs in response to the WCD timing out.

5. The WCD of claim 1, wherein the failure occurs in response to the WCD detecting an end of data session request.

6. The WCD of claim 1, further comprising means for performing a first comparison after the PPP1 link is established.

7. The WCD of claim 6, further comprising means for re-establishing the PPP2 link in response to the first comparison.

8. The WCD of claim 7, further comprising means for performing a second comparison after the PPP2 link is re-established.

9. The WCD of claim 8, wherein a no match is identified as a failure by the means for detecting that a PPP2 link failure has occurred.

10. In a wireless communication device (WCD), a method of establishing a PPP data session between a user terminal (UT) and an Interworking Function (IWF), comprising:
    establishing a PPP2 link with the IWF in response to detecting a mobile IP data session request from the UT;
    detecting a PPP1 link with the UT in response to the PPP2 link being established;
    detecting that a PPP2 link failure has occurred; and
    reconfiguring at least one of the WCD and the UT to an initial state.

11. The method of claim 10, wherein the failure occurs after the PPP2 link is established.

12. The method of claim 10, wherein the failure occurs before the PPP1 is established.

13. The method of claim 10, wherein the failure occurs in response to the WCD timing out.

14. The method of claim 10, wherein the failure occurs in response to the WCD detecting an end of data session request.

15. The method of claim 10, further comprising performing a first comparison after the PPP1 link is established.

16. The method of claim 15, further comprising re-establishing the PPP2 link in response to the first comparison.

17. The method of claim 16, further comprising performing a second comparison after the PPP2 link is re-established.

18. The method of claim 17, wherein a no match at the second comparison is identified as a failure when detecting that a PPP2 link failure has occurred.

* * * * *